(12) United States Patent
Jeon et al.

(10) Patent No.: US 12,731,109 B2
(45) Date of Patent: Sep. 8, 2026

(54) SYSTEM, APPARATUS, AND METHOD FOR PROVIDING A RECYCLING SERVICE FOR A PLASTIC USING BLOCKCHAIN

(71) Applicants: SK INNOVATION CO., LTD., Seoul (KR); SK GEO CENTRIC CO., LTD., Seoul (KR)

(72) Inventors: Chan Woong Jeon, Seoul (KR); June Haan Kwon, Seoul (KR); Moongoo Jeong, Daejeon (KR); Eun Hyang Cho, Seoul (KR); Seok Jun Kim, Seoul (KR); Joo Pyung Lee, Seoul (KR)

(73) Assignees: SK INNOVATION CO., LTD., Seoul (KR); SK GEO CENTRIC CO., LTD., Seoul (KR)

( * ) Notice: Subject to any disclaimer, the term of this patent is extended or adjusted under 35 U.S.C. 154(b) by 0 days.

(21) Appl. No.: 18/747,899

(22) Filed: Jun. 19, 2024

(65) Prior Publication Data

US 2025/0217778 A1 Jul. 3, 2025

(30) Foreign Application Priority Data

Jan. 2, 2024 (KR) ........................ 10-2024-0000367

(51) Int. Cl.
*G06Q 10/30* (2023.01)

(52) U.S. Cl.
CPC .................................. *G06Q 10/30* (2013.01)

(58) Field of Classification Search
None
See application file for complete search history.

(56) References Cited

U.S. PATENT DOCUMENTS 6,583,217 B1 * 6/2003 Li ......................... C04B 26/006 524/650
7,328,842 B2 * 2/2008 Wagner .................. G06Q 10/06 209/540

(Continued)

FOREIGN PATENT DOCUMENTS

JP 7101429 B1 * 7/2022 ............... H04L 9/50
KR 10-2020-0089818 A 7/2020

(Continued)

OTHER PUBLICATIONS

Suffescom Solutions. "Recycle To Earn App Development: An Innovative Marketplace To Improve Recycling of Waste." (Jun. 21, 2022). Retrieved online Jul. 22, 2025. https://www.suffescom.com/product/recycle-to-earn-app-development (Year: 2022).*

(Continued)

*Primary Examiner* — James A Reagan
(74) *Attorney, Agent, or Firm* — IP & T GROUP LLP

(57) ABSTRACT

Embodiments of the present disclosure provide a system, apparatus, and method for providing a recycling service for a plastic using a blockchain. The system includes a first electronic device of a collection company for collecting recycled materials from waste products; a second electronic device of a recycling company for compounding the recycled material with at least one additive to prepare a composite material; and a third electronic device of a production company for producing a product using the composite material.

20 Claims, 7 Drawing Sheets

(56) References Cited

U.S. PATENT DOCUMENTS

| | | | | |
|---|---|---|---|---|
| 10,909,547 | B1 * | 2/2021 | Guyer | F23J 15/02 |
| 11,374,756 | B1 * | 6/2022 | Myers | H04L 9/3213 |
| 11,403,626 | B2 * | 8/2022 | Chen | G06Q 20/065 |
| 11,551,189 | B2 * | 1/2023 | O'Brien | H04L 9/32 |
| 11,938,119 | B2 * | 3/2024 | Leo | A61K 36/185 |
| 2014/0309319 | A1 * | 10/2014 | Stefandl | C08J 11/04<br>521/49.8 |
| 2015/0118723 | A1 * | 4/2015 | Duzoglou | C12M 43/00<br>435/292.1 |
| 2016/0045841 | A1 * | 2/2016 | Kaplan | C01B 17/027<br>429/49 |
| 2019/0005507 | A1 * | 1/2019 | Rodoni | B09B 1/00 |
| 2019/0198862 | A1 * | 6/2019 | Campbell | H01G 11/86 |
| 2019/0295045 | A1 * | 9/2019 | Stöcker | G06Q 20/065 |
| 2020/0143336 | A1 * | 5/2020 | Klinkhamer | G06Q 20/40145 |
| 2020/0372498 | A1 * | 11/2020 | Chen | G06Q 20/3678 |
| 2021/0182801 | A1 * | 6/2021 | O'Brien | H04L 9/3239 |
| 2021/0251157 | A1 * | 8/2021 | Leo | A23L 33/105 |
| 2021/0272074 | A1 * | 9/2021 | Peacemaker | G06Q 10/30 |
| 2022/0162103 | A1 * | 5/2022 | Lorton | C02F 3/34 |
| 2022/0331841 | A1 * | 10/2022 | Filler | G06N 3/08 |
| 2023/0010172 | A1 * | 1/2023 | Myers | H04L 9/0819 |
| 2023/0036694 | A1 * | 2/2023 | Coughlan | H04L 9/0861 |
| 2023/0252405 | A1 * | 8/2023 | Bales | G06Q 10/0833<br>705/28 |

FOREIGN PATENT DOCUMENTS

| | | | | |
|---|---|---|---|---|
| KR | 10-2535185 B1 | | 5/2023 | |
| KR | 10-2023-0109096 A | | 7/2023 | |
| WO | WO-2010009448 A1 | * | 1/2010 | G06Q 30/00 |
| WO | WO-2021119602 A1 | * | 6/2021 | H04L 9/50 |

OTHER PUBLICATIONS

Thomas Rumetshofer et al. "Information-Based Plastic Material Tracking for Circular Economy—A Review." (Mar. 24, 2023). Retrieved online Jul. 22, 2025. https://www.mdpi.com/2073-4360/15/7/1623 (Year: 2023).*

Nir Kshetri. "Blockchain and Supplychain Management." (2021). Retrieved online Jul. 22, 2025. https://eresults.naub.edu.ng/Content/Library/mat/1.pdf (Year: 2021).*

* cited by examiner

[FIG. 1]
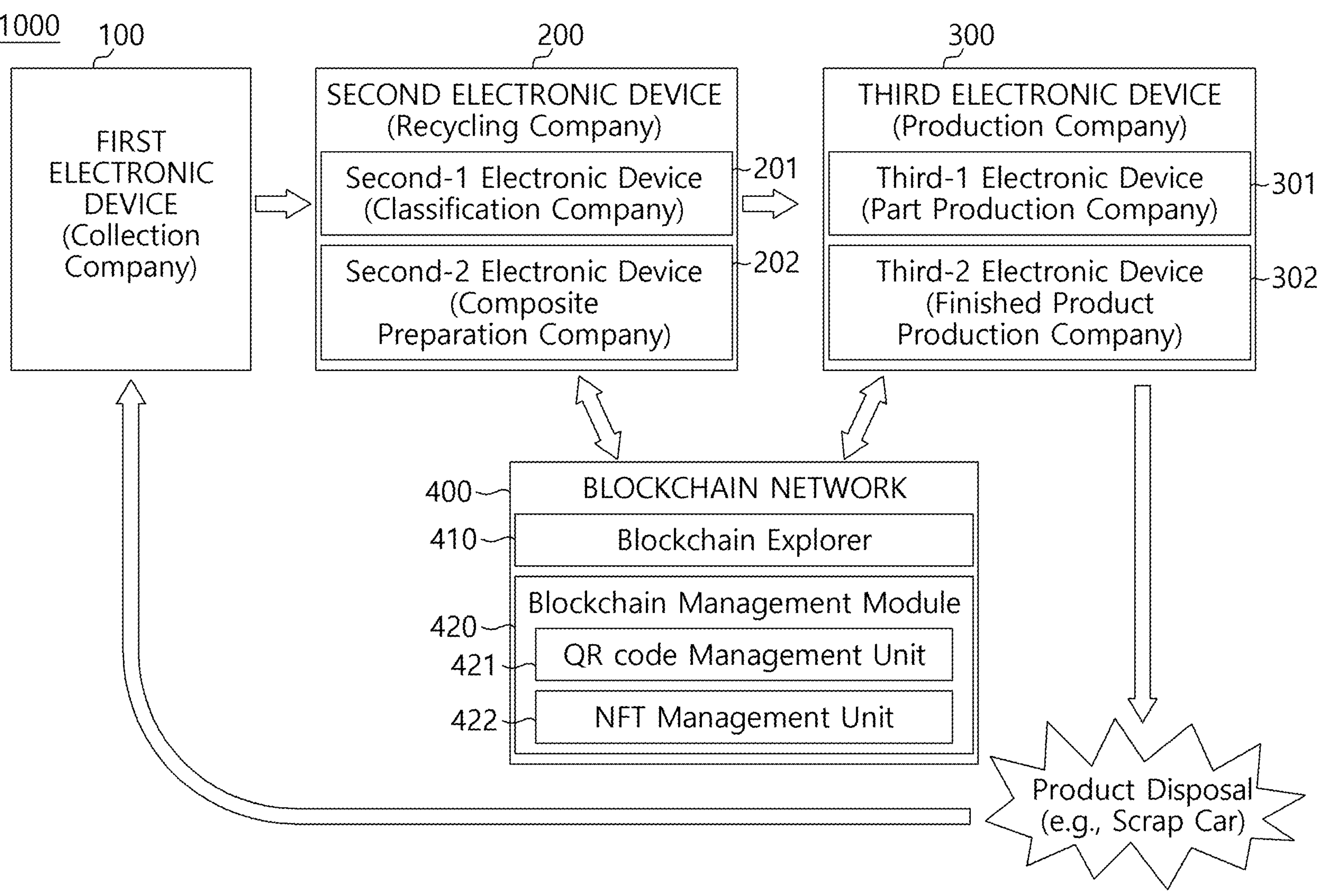

[FIG. 2A]
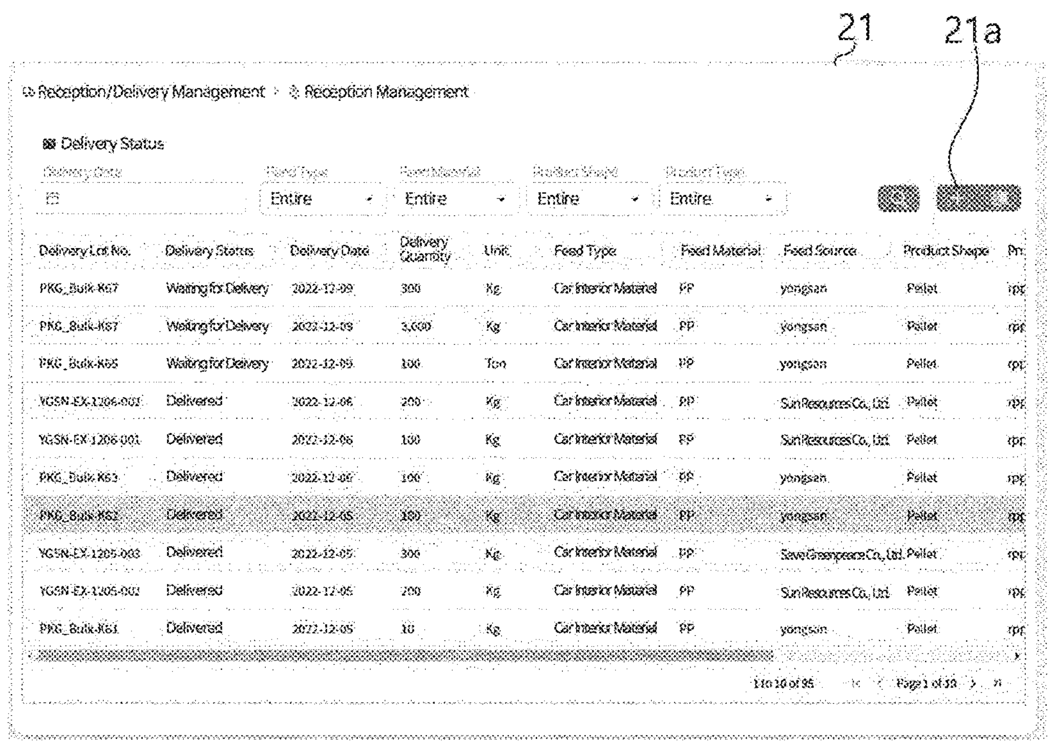
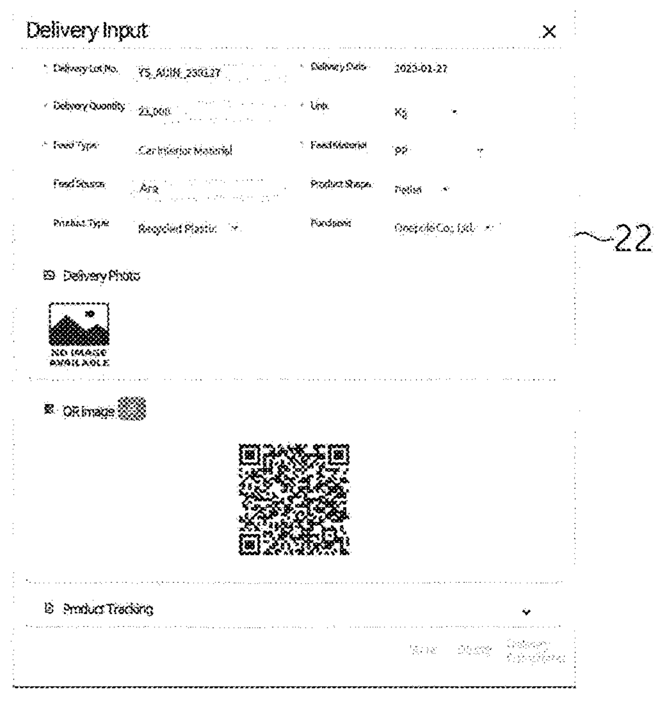

[FIG. 2B]
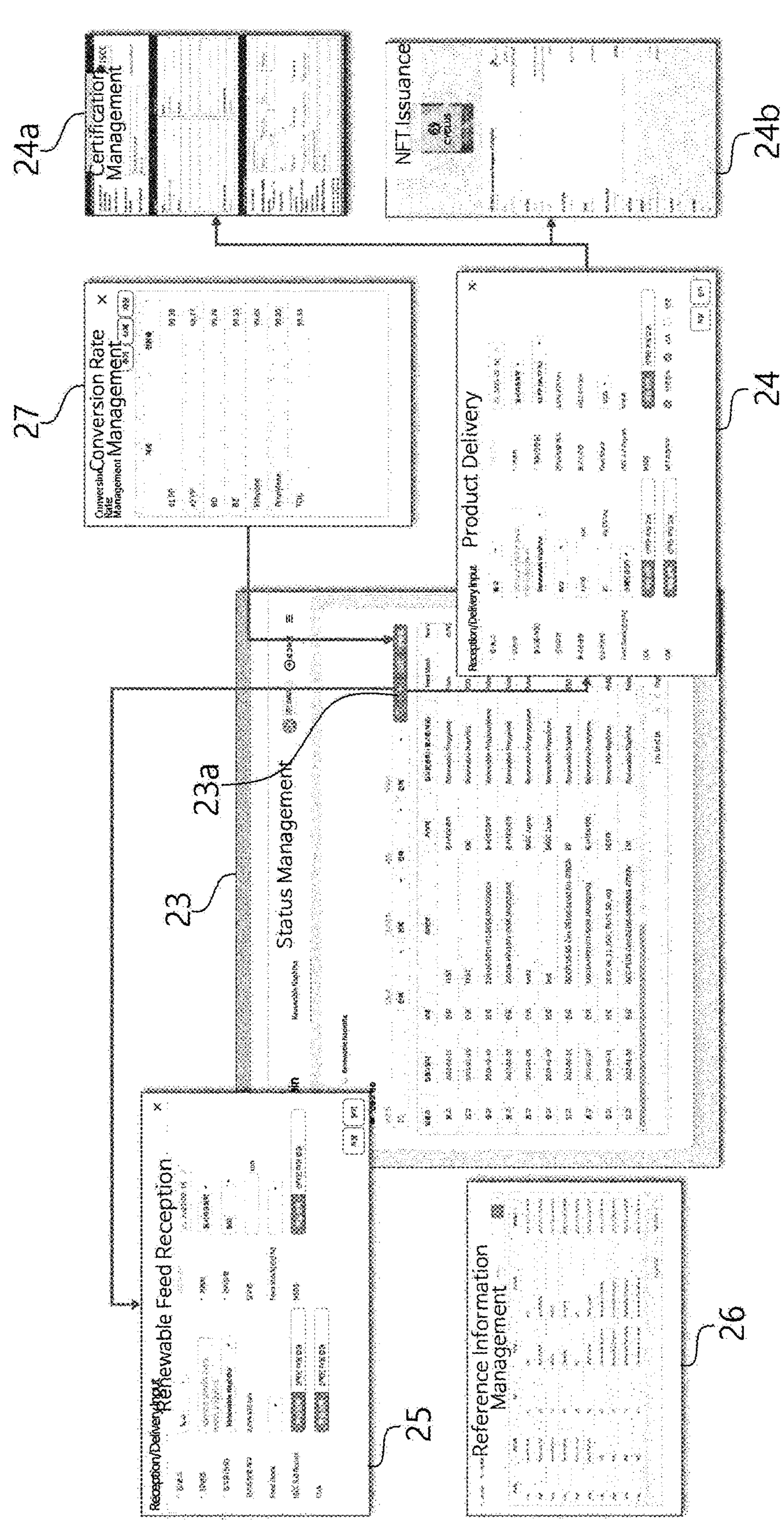

[FIG. 2C]
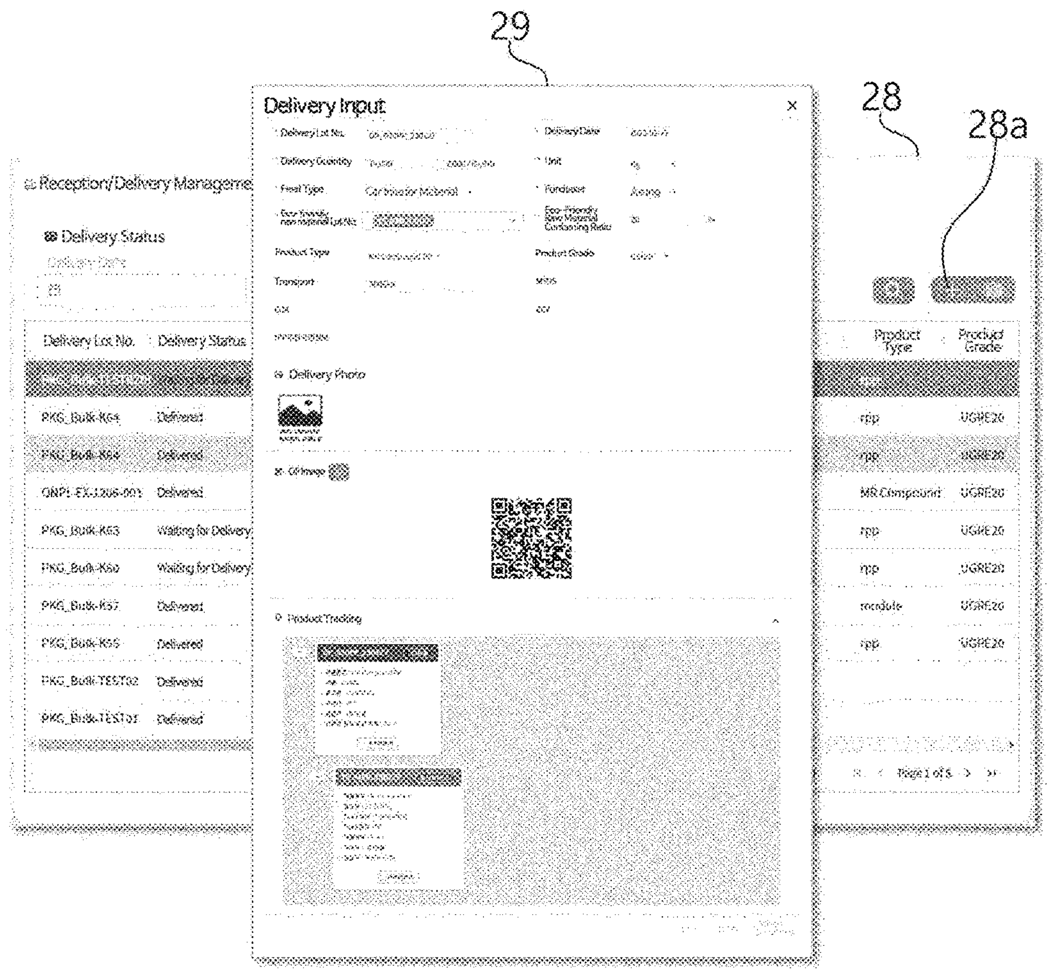

[FIG. 2D]
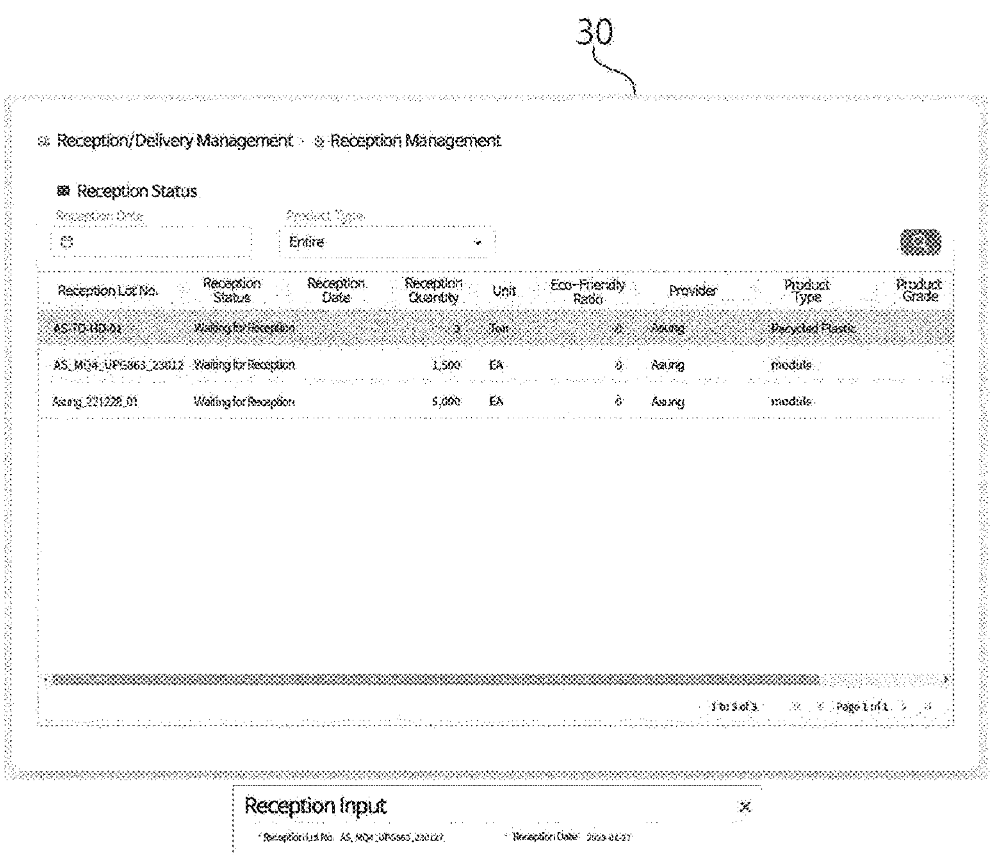
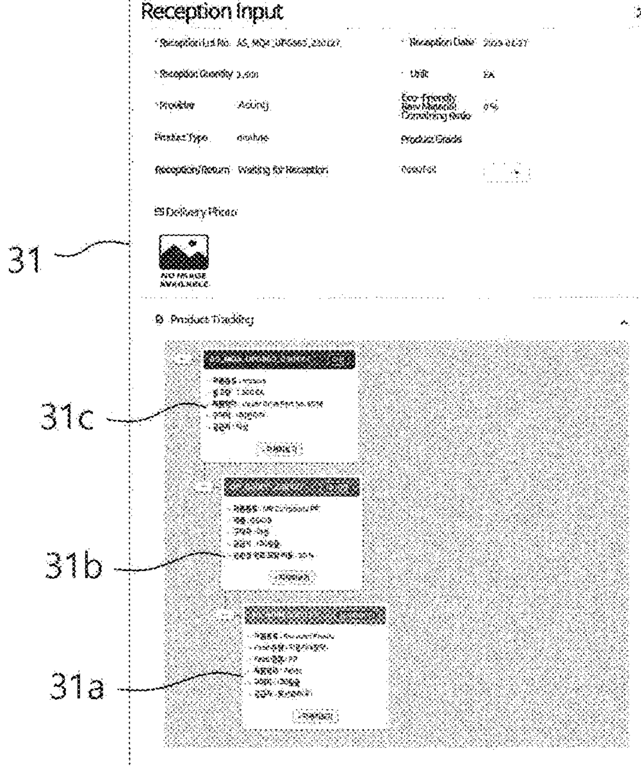

[FIG. 3]
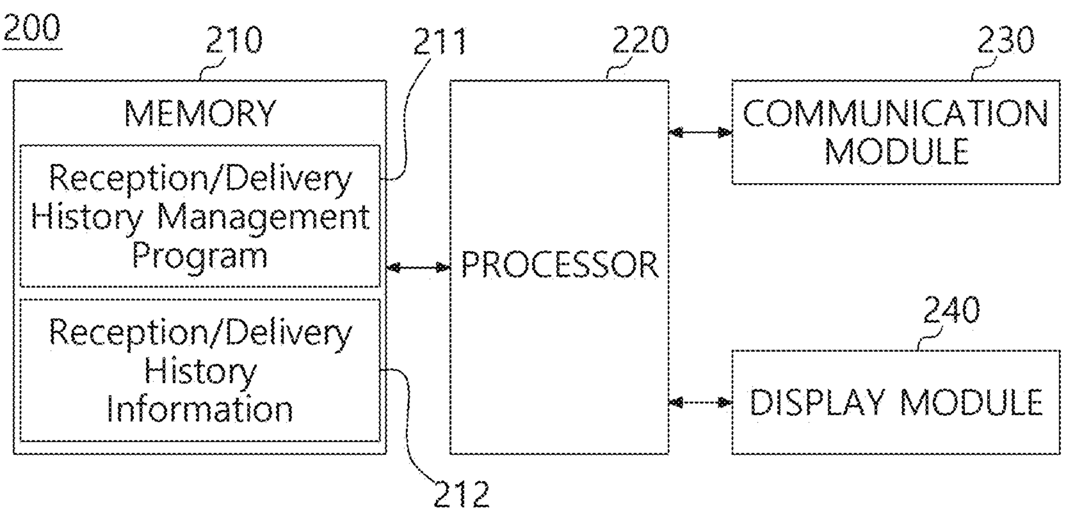

[FIG. 4]
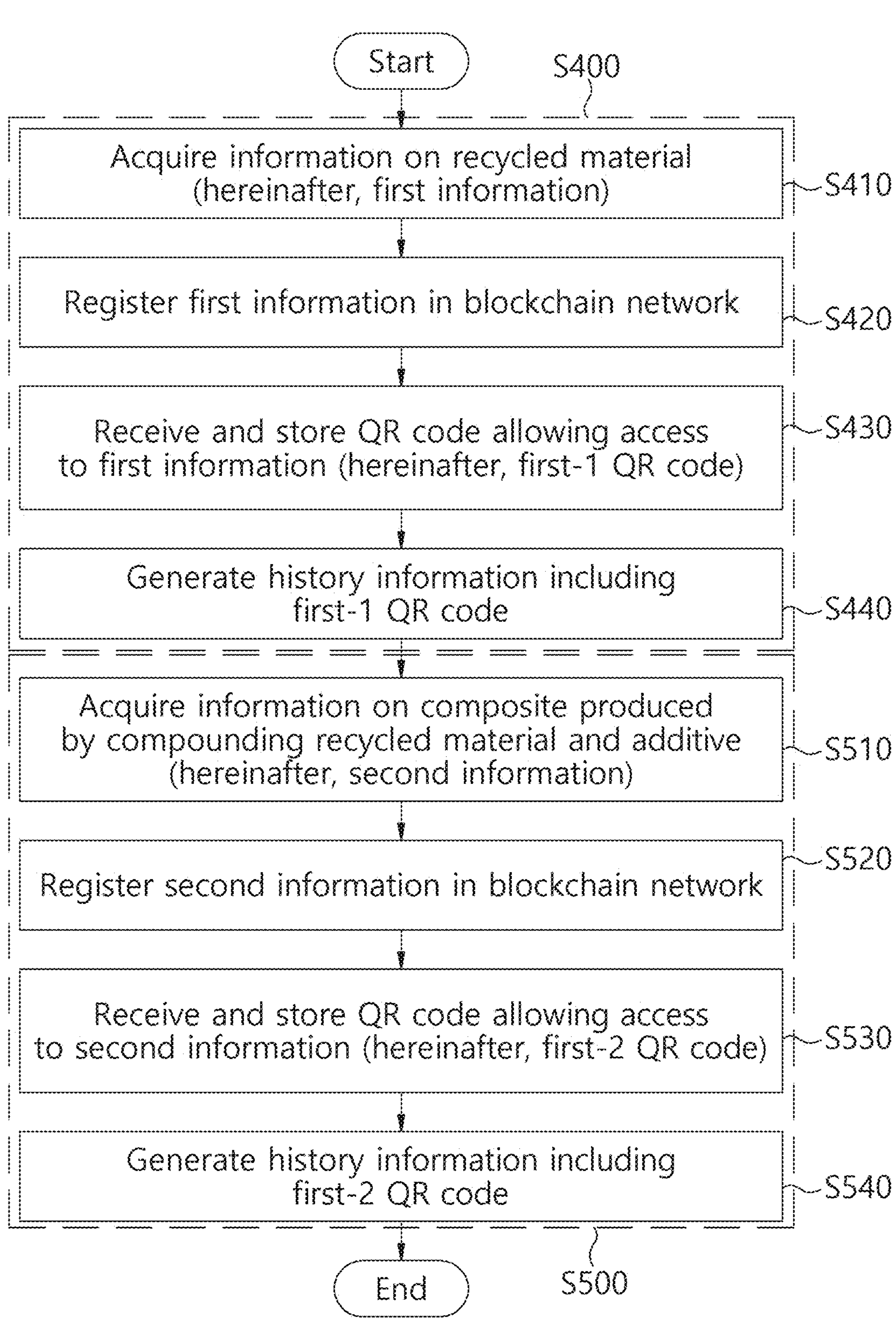

SYSTEM, APPARATUS, AND METHOD FOR PROVIDING A RECYCLING SERVICE FOR A PLASTIC USING BLOCKCHAIN

CROSS-REFERENCES TO RELATED APPLICATION

The present application claims priority under 35 U.S.C. § 119(a) to Korean patent application number 10-2024-0000367, filed on Jan. 2, 2024, which is incorporated herein by reference in its entirety.

BACKGROUND

1. Technical Field

Embodiments of the present disclosure relate generally to a system, apparatus, and method for providing a recycling service for a plastic, and, more particularly to a system, apparatus, and method for providing a recycling service for a plastic using a blockchain.

2. Description of the Related Art

As the amount of waste plastic is rapidly increasing, social and environmental concerns are being raised, and regulations relating to the disposal of waste plastic are proliferating. Accordingly, a variety of technologies are being explored for implementing carbon neutrality through recycling of waste plastics. In particular, as interest in eco-friendliness has grown, interest in the use and recycling of recyclable eco-friendly materials is also increasing.

However, at the present time, the history of waste plastic is not managed at all or may be managed manually, and the efficiency of existing waste plastic collection and classification processes is very low. This in turn makes it difficult to recycle waste plastic into useful materials in an economically efficient way. In addition, there are issues that make it difficult to check the materials included in the waste plastic and the contents of each material (especially a proportion of eco-friendly materials), and even if it is possible to check them, it is difficult to trust the checked results.

SUMMARY

Embodiments of the present disclosure provide a system, apparatus, and method for providing a recycling service for a plastic using a blockchain which may provide information on the recycled plastic reliably.

According to embodiments of the present disclosure, a system for providing a recycling service for a plastic using a blockchain, includes a first electronic device on a side of a collection company which collects a recyclable material (hereinafter, a recycled material) from a waste product; a second electronic device on a side of a recycling company which compounds the recycled material and at least one additive to prepare a composite; and a third electronic device on a side of a production company which produces a product using the composite, wherein the first electronic device is configured to manage information on the collected recycled material, the second electronic device is configured to acquire information on the composite, to register the acquired information on the composite in a blockchain network, to receive from the blockchain network a first two-dimensional code allowing access to the information on the composite registered in the blockchain network, to store the first two-dimensional code, and to add the first two-dimensional code to a delivery information of the composite, and the third electronic device is configured to recognize the first two-dimensional code, to access information on the composite registered in the blockchain network, to acquire information on the composite, and to manage a delivery history of the product produced using the composite.

According to an embodiment, when the second electronic device includes a second-1 electronic device on a side of a classification company which classifies the recycled materials by type, and a second-2 electronic device on a side of a composite preparation company which prepares the composite by compounding the classified recycled material and the at least one additive, the first two-dimensional code may include a first-1 two-dimensional code allowing access to information on the classified recycled material registered in the blockchain network by the second-1 electronic device; and a first-2 two-dimensional code allowing access to information on the composite registered in the blockchain network by the second-2 electronic device.

According to an embodiment, when the third electronic device includes a third-1 electronic device on a side of a part production company which produces parts using the composite, and a third-2 electronic device on a side of a finished product production company which produces a finished product using the parts, the third-1 electronic device registers information on the parts in the blockchain network, may receive from the blockchain network a second two-dimensional code allowing access to the information on the parts registered in the blockchain network, store the second two-dimensional code, and add the second two-dimensional code to delivery information of the parts.

According to an embodiment, the first electronic device may separate a recycled material from a finished product in which a disposal is requested, access the information stored in the blockchain network through two-dimensional code recognition when the separated recycled material includes the second two-dimensional code, acquire information on the recycled material from the information stored in the blockchain network, and store the acquired information.

According to an embodiment, the second electronic device may receive a non-fungible token (NFT) representing a value of the composite from the blockchain network, and include the non-fungible token to the delivery information of the composite.

According to an embodiment, the non-fungible token may include at least one of issuance date information, transaction information, owner information, product information, and life cycle assessment (LCA) information of the composite.

According to an embodiment, the second electronic device may manage reception information of the recycled material, the delivery information of the composite, reference information on the recycled material and the composite, conversion rate information of the recycled material, and eco-friendly certification information on the composite.

According to an embodiment, the delivery information may include at least one of a feed source, feed type, ratio of each additive, grade, certification information, and life cycle assessment information.

According to embodiments of the present disclosure, an apparatus for providing a recycling service for a plastic using a blockchain includes a communication module configured to perform communication connection with a blockchain network which stores data in a plurality of connected nodes in a distributed manner; a memory configured to store reception/delivery history information; and a processor configured to acquire information on a composite prepared by compounding a recycled material and at least one additive, register the acquired information on the composite in the blockchain network through the communication module, receive from the blockchain network a two-dimensional code allowing access to the information on the composite registered in the blockchain network through the communication module, store the two-dimensional code allowing access to the information on the composite in the memory, and add the two-dimensional code allowing access to the information on the composite to delivery information of the composite.

According to an embodiment, the processor may control the communication module to transmit the delivery information of the composite to which the two-dimensional code is added to an electronic device of a purchaser who purchased the composite.

According to an embodiment, the processor may receive a non-fungible token (NFT) representing a value of the composite from the blockchain network, and transmit the NFT to the purchaser's electronic device upon delivery of the composite.

According to an embodiment, the processor may be configured to acquire information on the recycled material; register the acquired information on the recycled material in the blockchain network; receive from the blockchain network a two-dimensional code allowing access to the information on the recycled material registered in the blockchain network; store the two-dimensional code allowing access to the information on the recycled material in the memory; and add the two-dimensional code allowing access to the information on the recycled material to delivery information of the recycled material.

According to an embodiment, the processor may transmit the delivery information of the recycled material including the two-dimensional code allowing access to the information on the recycled material to an electronic device of a purchaser who purchased the recycled material through the communication module.

According to an embodiment, the processor may access the blockchain network and acquire information on the recycled material from the blockchain network based on the two-dimensional code included in the delivery information of the recycled material.

In addition, according to another embodiment of the present disclosure, a method for providing a recycling service for a plastic using a blockchain, includes acquiring information on a composite prepared by compounding a recycled material and at least one additive; registering the acquired information on the composite in a blockchain network; receiving from the blockchain network a two-dimensional code allowing access to the information on the composite registered in the blockchain network and storing the two-dimensional code in a memory; and adding the two-dimensional code allowing access to the information on the composite to delivery information of the composite.

According to an embodiment, the method may further include transmitting the delivery information of the composite including the two-dimensional code allowing access to information on the composite to an electronic device of a purchaser who purchased the composite.

According to an embodiment, the method may further include receiving a non-fungible token (NFT) representing a value of the composite from the blockchain network; and transmitting the non-fungible token to the purchaser's electronic device upon delivery of the composite.

According to an embodiment, the method may further include acquiring information on the recycled material; registering the acquired information on the recycled material in the blockchain network; receiving a two-dimensional code allowing access to the information on the recycled material registered in the blockchain network and storing the two-dimensional code in the memory; and adding the two-dimensional code allowing access to the information on the recycled material to the delivery information of the recycled material.

According to an embodiment, the method may further include transmitting the delivery information of the recycled material including the two-dimensional code allowing access to the information on the recycled material to an electronic device of a purchaser who purchased the recycled material.

According to an embodiment, the operation of acquiring information on the composite may include accessing the blockchain network and acquiring information on the recycled material from the blockchain network based on the two-dimensional code included in the delivery information of the recycled material.

According to embodiments of the present disclosure, it is possible to improve the reliability of recycled plastic by tracking the distribution process for recycling of plastic, and recording information related to the recycling process and the recycled plastic on a blockchain.

According to embodiments of the present disclosure, the reliability of recycled plastic is improved, such that procedures for analyzing and classifying the components of plastic during the recycling process may be simplified. For example, it is possible to easily classify plastics having the same component based on reliable information recorded on the blockchain. Thus, the convenience of recycling the waste plastic may be improved.

BRIEF DESCRIPTION OF THE DRAWINGS

The above and other objects, features and advantages of the embodiments of the present disclosure will be more clearly understood from the following detailed description taken in conjunction with the accompanying drawings, in which:

FIG. 1 is a block diagram illustrating a system for providing a recycling service for a plastic using a blockchain according to an embodiment of the present disclosure;

FIGS. 2A to 2D are views respectively illustrating examples of an interface screen of electronic devices included in the recycling system according to an embodiment of the present disclosure;

FIG. 3 is a block diagram illustrating a configuration of an apparatus for providing a recycling service for a plastic using a blockchain according to an embodiment of the present disclosure; and FIG. 4 is a flowchart describing a method for a recycling service for a plastic using a blockchain according to an embodiment of the present disclosure.

DETAILED DESCRIPTION

Hereinafter, the present disclosure will be described in detail through embodiments with reference to the accompanying drawings. However, the embodiments are merely illustrative and the present disclosure is not limited to the specific embodiments described by way of example.

Although the terms “a first,” “a second,” and the like may be used to describe various elements, components and/or sections, these elements, components and/or sections may not be limited by these terms. These terms are merely used to distinguish one element, component and/or section from another element, component and/or section. Therefore, the first element, first component, or first section mentioned below may also be the second element, second component or second section within the technical concept of the present disclosure.

Terms used herein are for the purpose of describing particular embodiments only and are not intended to limit the present disclosure thereto. As used herein, singular forms are intended to include the plural forms as well, unless the context clearly indicates otherwise. It will be further understood that the terms "comprises" and/or "made of," as used herein, do not preclude the presence or addition of one or more components, steps, operations and/or elements other than the mentioned component, step, operation and/or element.

Unless otherwise defined, all terms (including technical and scientific terms) used herein have the same meaning as commonly understood by one of ordinary skill in the art to which the present disclosure pertains. Terms, such as those defined in commonly used dictionaries, are not to be construed in an idealized or overly formal sense unless expressly so defined herein.

FIG. 1 is a simplified block diagram describing a process of recycling a plastic using a blockchain according to an embodiment of the present disclosure. FIGS. 2A to 2D are views respectively illustrating examples of an interface screen of electronic devices included in a recycling system according to an embodiment of the present disclosure.

Referring to FIGS. 1 to 2D, a recycling system for a plastic 1000 according to an embodiment of the present disclosure may include a first electronic device 100, a second electronic device 200, a third electronic device 300, and a blockchain network 400.

The first electronic device 100 may be a terminal of a company which collects recycled materials (e.g., plastic) (hereinafter, a collection company), the second electronic device 200 may be a terminal of a company which recycles the recycled materials (hereinafter, a recycling company), and the third electronic device 300 may be a terminal of a company which produces products using the recycled materials (hereinafter, a production company).

The first electronic device 100 may manage information (e.g., components of the recycled material, reception/delivery history, etc.) on the collected (or described as received) recycled materials. For example, the collection company may collect waste products (e.g., a waste car, water purifier, television, washing machine, refrigerator, plastic bottles, plastic films etc.), separate materials which can be recycled from the collected waste products. These materials are also referred to as "recyclable materials" or "recycled materials." The recycled materials may be, for example, plastic bottles, plastic films, or a plastic part included in a waste product such as car interior material, a water purifier filter, television, washing machine, refrigerator, etc. The collection company may package the separated recycled materials, and deliver the packaged separated recycled materials to the recycling company. For example, the collection company may sell the packaged separated recycled materials to the recycling company. The first electronic device 100 may provide delivery information including information on the recycled materials to the second electronic device 200 of the recycling company upon delivery of the recycled material to the recycling company.

According to an embodiment, when the collected recycled material includes a two-dimensional code to be described below, the first electronic device 100 may access information stored in the blockchain network 400 through two-dimensional code recognition, acquire information on the recycled material from the information stored in the blockchain network 400, and store the acquired information.

The second electronic device 200 may transmit a request for ordering the recycled material to the first electronic device 100. The second electronic device 200 may receive delivery information on the ordered recycled material from the collection company of the recycled material and store the delivery information. According to an embodiment, the second electronic device 200 may manage information on a composite (also referred to as a composite material) prepared based on the recycled material. The information on the composite may include at least one of the components of the composite, the reception and/or delivery history, and the like. In addition, the second electronic device 200 may manage reception information of the recycled material, delivery information of the composite, reference information on the recycled material and composite, conversion rate information of the recycled material, and eco-friendly certification information on the composite.

The composite may be prepared by compounding the recycled material and at least one additive (or additive agent). Specifically, the composite may be prepared by classifying the received recycled materials by type (e.g., component), blending the classified recycled materials, and compounding the blended materials and at least one additive. The at least one additive may be an eco-friendly material.

The second electronic device 200 may register (or record) information on the composite in the blockchain network 400. In addition, the second electronic device 200 may generate a first two-dimensional code allowing access to the information registered in the blockchain network 400, and store the generated first two-dimensional code. The two-dimensional code may include a Quick Response (OR) code, bar code, GS1 bar code, data matrix code, veri code and the like. Hereinafter, the case where the two-dimensional code is the QR code will be described as an example. The second electronic device 200 may include the first QR code in the delivery information of the composite. The second electronic device 200 may transmit the delivery information of the composite including the first QR code to the third electronic device 300. In addition, the first QR code may be printed and attached on a packaging box in which the composite is packaged before it is delivered to the production company.

The second electronic device 200 may generate a non-fungible token (NFT) based on the delivery information on the composite in order to assign a value to the composite. For example, the second electronic device 200 may automatically generate an NFT upon completion of the delivery and transmit the generated NFT to the third electronic device 300. The NFT may include at least one of an issue date, transaction information, owner information, product information, and the QR code. In an embodiment, the NFT may include an issue date, transaction information, owner information, product information, and the QR code.

The second electronic device 200 may include a second-1 electronic device 201 and a second-2 electronic device 202. That is, recycling of the recycled materials may be performed separately by two companies. The second-1 electronic device 201 is a terminal on a side of a classification company which classifies the recycled materials received from the collection company by type, and the second-2 electronic device 202 is a terminal on a side of a composite preparation company which blends and compounds the recycled materials classified by the classification company to prepare one or more composites.

The classification company may classify the recycled materials received from the collection company by type, cut (e.g., pelletize) the recycled materials into a small size, package the small-cut recycled materials, and sell them to the composite preparation company. The second-1 electronic device 201 of the classification company may receive information on the classified recycled materials (hereinafter, first information) as an input, register the input first information in the blockchain network 400, receive a QR code allowing access to the first information (hereinafter, a first-1 QR code) from the blockchain network 400, and provide delivery information including the first information and the first-1 QR code to the second-2 electronic device 202. In addition, the first-1 QR code may be printed and attached on a packaging box (e.g., on a side of the packaging box) in which the cut recycled materials are packaged in order to deliver them to the composite preparation company. Here, as shown in FIG. 2A, the first information may be input through a delivery input interface screen 22 displayed upon selection of an additional menu 21*a* included on one side of a delivery management interface screen 21. The first information may include at least one of a producer, lot number (Lot No.), delivery date, delivery quantity, feed source (e.g., collection company), feed type (e.g., car interior material), and feed material (e.g., polypropylene (PP)), shape of recycled material (e.g., pellets), type of recycled material (e.g., recycled plastic), purchaser, and delivery photo, but the embodiment is not limited thereto.

The composite preparation company may recognize the first-1 QR code included in the delivery information (and/or attached to the packaging box) provided by the second-1 electronic device 201, and access the first information registered in the blockchain network 400 to check the information on the recycled materials. In addition, the composite preparation company may blend the recycled materials received from the classification company by type, compound the blended recycled materials and at least one additive to prepare a composite, package the composite, and sell it to the production company. The second-2 electronic device 202 of the composite preparation company may receive information on the composite (hereinafter, second information) as an input, register the input second information in the blockchain network 400, receive a QR code allowing access to the second information (hereinafter, a first-2 QR code) from the blockchain network 400, and provide delivery information including the second information and the first-2 QR code to the third electronic device 300. Further, the first-2 QR code may be printed and attached to one side of a packaging box in which the composite is packaged in order to deliver it to the production company. Here, as shown in FIG. 2B, the second information may be input through a delivery input interface screen 24 displayed upon selection of an additional menu 23*a* included in a status management interface screen 23. The second information may include at least one of the producer, lot number, delivery date, delivery quantity, feed source, feed type, lot number of each additive, ratio of each additive, composite type, composite grade (e.g., eco-friendly grade), purchaser, and delivery photo, but the embodiment is not limited thereto.

In addition, the second information may further include at least one of authentication information 24*a* (e.g., certificate of analysis (COA), material safety data sheet (MSDS) and non-fungible token (NFT) information (24*b*), and life cycle assessment (LCA) information (not shown) of the composite. The non-fungible token (NFT) is intended to assign a value to the composite, and may be generated by the blockchain network 400 based on the delivery information on the composite. The blockchain network 400 may automatically generate a non-fungible token (NFT) upon delivery of the composite. When the non-fungible token (NFT) is generated, the second-2 electronic device 202 may receive the non-fungible token (NFT) from the blockchain network 400, and transmit the received non-fungible token (NFT) to the third electronic device 300. The NFT may include at least one of issue date information, transaction information, owner information, product information, first-2 QR code, authentication information (e.g., certificate of analysis (COA), material safety data sheet (MSDS)), and life cycle assessment (LCA) information of the composite. The NFT may be included in the delivery information of the composite. Hence, the delivery information of the composite may include the NET generated by the Blockchain Network 400.

The status management interface screen 23 may include at least one of a reception input interface screen 25, a reference information management interface screen 26 for managing the reference information on the recycled material and the composite, and a conversion rate management interface screen 27.

The third electronic device 300 may transmit a request for ordering the composite to the second electronic device 200, and receive and store delivery information on the ordered composite from the second electronic device 200. For example, the production company may order the composite to the recycling company through the third electronic device 300, receive the ordered composite from the recycling company, and produce a product (e.g., parts or a finished product) using the composite. In this case, the third electronic device 300 of the production company may receive the delivery information from the second electronic device 200 of the recycling company which includes the NFT generated by the Blockchain Network and may store the delivery information.

According to an embodiment, the third electronic device 300 may manage information (e.g., components of the composite used, reception/delivery history, etc.) on the product (e.g., the parts and/or finished product) produced based on the composite. For example, the third electronic device 300 may recognize the first-1 QR code (and/or the first-2 QR code) included in the delivery information (or attached to the packaging box) received from the second electronic device 200 (or the second-2 electronic device 202), access the information (or the second information) registered in the blockchain network 400 to check the information on the composite. In addition, the third electronic device 300 may register information on the product in the blockchain network 400 based on the information on the composite checked in the blockchain network 400. Further, the third electronic device 300 may generate a second quick response (OR) code allowing access to the information registered in the blockchain network 400, and store the generated second QR code. The third electronic device 300 may include the second QR code in the delivery information of the product. The second QR code may be printed, and then attached to one side of the product.

The third electronic device 300 may include a third-1 electronic device 301 and a third-2 electronic device 302. That is, production of the product may be performed by dividing into two companies. The third-1 electronic device 301 is a terminal of a company which produces parts for a finished product (hereinafter, a part production company) using the composite received from the recycling company, and the third-2 electronic device 302 is a terminal of a company which produces a finished product (hereinafter, a finished product production company) using the parts produced by the part production company.

The part production company may produce an assembly part by injecting the composite received from the recycling company 200 (e.g., the composite preparation company 202), package the assembly part, and sell it to the finished product production company. The third-1 electronic device 301 of the part production company may input information on the produced assembly part (hereinafter, third information), register the input third information in the blockchain network 400, receive the second QR code allowing access to the third information from the blockchain network 400, store the second QR code, add the second QR code to delivery information on the parts, and provide delivery information including the third information and the second QR code to the third-2 electronic device 302. In addition, the second QR code may be printed, and then attached to one side of the packaging box (or one side of the assembly part) in which the assembly part is packaged in order to deliver it to the finished product production company. Here, as shown in FIG. 2C, the third information may be input through a delivery input interface screen 29 displayed upon selection of an additional menu 28*a* included in a delivery status management interface screen 28. The third information may include at least one of the producer, lot number, delivery date, delivery quantity, additive raw material lot, product number, product name, weight, purchaser and delivery photo, but the embodiment is not limited thereto.

The finished product production company may produce a finished product using the assembly part received from the part production company, inspect the produced finished product, and sell the finished product on which the inspection has been completed to the market. When the second QR code is attached only to the packaging box, the finished product production company may print the second QR codes and attach them to one side of each assembly part or to an assembly of parts. The third-2 electronic device 302 of the finished product production company may manage information on at least one assembly part or of an assembly of parts used in the finished product. For example, as shown in FIG. 2D, when a specific item 30*a* is selected on a reception status interface screen 30, the third-2 electronic device 302 may display a reception history interface screen 31 for the selected item 30*a*. The reception history interface screen 31 may include all previous history information. For example, the reception history interface screen 31 may include delivery information of the second-1 electronic device 201 (or reception information of the second-2 electronic device 202) 31*a*, delivery information of the second-2 electronic device 202 (or reception information of the third-1 electronic device 301)) 31*b*, and delivery information of the third-1 electronic device 301 (or reception information of the third-2 electronic device 302) 31*c*. Through this, a user (e.g., the finished product production company) of the third-2 electronic device 302 may easily track a distribution process of the recycled material.

In addition, the third-2 electronic device 302 may recognize the second QR code included in the delivery information (or attached to the packaging box) provided by the third-1 electronic device 301, and access the third information registered in the blockchain network 400 to check information on the part assemblies.

The blockchain network 400 may store data in a plurality of connected nodes in a distributed manner. For example, the blockchain network 400 is a consensus system composed of a plurality of devices, and may store data (e.g., information on transaction details) in some storage space of each node in a distributed manner. Specifically, the blockchain network 400 forms blocks containing determined transaction details for a certain period of time, and transmits the blocks to all participants in the network. In this case, the participants check the validity of the transaction, and only blocks approved by the participants are connected to the existing blockchain to ensure that the transaction takes place. Here, the blockchain also called a public transaction ledger is a form of a distributed database capable of preventing hacking that may occur when trading with virtual currency, and is a technology that has been invented to prevent arbitrary manipulation by an operator of distributed nodes as a continuously growing list of data records. The embodiments of the present disclosure stores information generated during the recycling service process on the blockchain in a distributed manner using the blockchain technology, such that the circulation process from collection of the recycled materials to disposal may be tracked thus to guarantee transparency and reliability of information generated in each process, and immediate information may be provided to the users.

The blockchain network 400 may be a blockchain-as-a-service (BaaS) based on cloud platform. The blockchain network 400 may be a private blockchain that can only be used by limited users with permissions.

The blockchain network 400 may include a blockchain explorer 410 and a blockchain management module 420. The blockchain explorer 410 may explore all transaction details in past and present blockchains.

The blockchain management module 420 may track the recycling process, and manage information generated during the recycling process. The blockchain management module 420 may include a QR code management unit 421 configured to manage the generation of the QR code and a non-fungible token (NFT) management unit 422 configured to manage the generation of non-fungible token.

When disposal of the finished product (e.g., scrapping a car) is requested, the finished product for which disposal is requested may be collected by the collection company (or recycling company). In this way, the recycling system 1000 according to an embodiment of the present disclosure may have a closed loop in the circulation process of the recycled materials, thereby providing continuous recirculation of the resources. In addition, the collection company may easily check the information (e.g., components) of the recycled materials through the second QR code attached to materials separated from waste products, and easily classify the recycled materials by type using the checked information. Further, the collection company may classify only reliable recycled materials using the checked information.

The case where the recycling processes are separately performed in a plurality of companies has been illustrated and described in FIG. 1, but at least some of the recycling processes may be integrated and performed by one company. For example, the collection and recycling processes of the recycled materials may be performed by one company, the recycling and production processes of the recycled materials may be performed by one company, and the collection, recycling and production processes of the recycled materials may be performed by one company.

In addition, the interface screens shown in FIGS. 2A to 2D are only examples, and do not limit the embodiments of the present disclosure.

FIG. 3 is a block diagram illustrating the configuration of an apparatus for providing a recycling service for a plastic using a blockchain according to an embodiment of the present disclosure.

Referring to FIG. 3, an apparatus for providing a recycling service for a plastic using a blockchain (hereinafter, an apparatus) 200 according to an embodiment of the present disclosure may correspond to the second electronic device 200 (or the second-2 electronic device 202) of the recycling system 1000 shown in FIG. 1.

The apparatus 200 may include a memory 210, a processor 220, a communication module 230, and a display module 240.

The memory 210 may store a program for controlling an operation of the apparatus 200. In addition, the memory 210 may store information necessary to control the operation of the apparatus 200. According to an embodiment, the memory 210 may store a program 211 for managing input/output history and reception/delivery history information 212. The reception/delivery history management program 211 may generate reception details of the recycled materials and delivery details of the composites, and store the generated reception details and delivery details as the reception/delivery history information 212.

The processor 220 may control an overall operation of the apparatus 200. For example, the processor 220 may acquire information on a composite prepared by compounding the recycled material and at least one additive (e.g., eco-friendly material), register the acquired information on the composite in the blockchain network through the communication module 230, receive from the blockchain network a QR code (e.g., the first-1 QR code, the first-2 QR code) allowing access to the information on the composite registered in the blockchain network, add the QR code allowing access to the information on the composite to delivery information of the composite, and store the received QR code in the memory 210. The processor 220 may receive a non-fungible token (NFT) for the composite from the blockchain network, transmit the NFT to an electronic device of a purchaser who purchased the composite upon delivery thereof, and store the received non-fungible token in the memory 210. Specific operations of the processor 220 will be described in detail below with reference to FIG. 4.

The communication module 230 may communicate with an external device (not shown) (e.g., the blockchain network 400) through a wired or wireless network. For example, the communication module 440 may transmit first information related to the recycled material and/or second information related to the composite to the external device through the wired or wireless network, and receive a first-1 QR code allowing access to the first information and/or a first-2 QR code allowing access to the second information from the external device. The communication module 440 may receive the non-fungible token (NFT) from the external device through the wired or wireless network. In addition, the communication module 230 may receive reception information of the recycled material from an external device (e.g., the first electronic device 100), and transmit the delivery information of the composite to an external device (e.g., the third electronic device 300).

The display module 240 may output various interface screens for managing the reception/delivery history. For example, the display module 240 may output a reception interface screen for inputting information on the received recycled material, a delivery interface screen for inputting information on the composite to be delivered, a reference information interface screen for managing the reference information, a conversion rate management interface screen, an eco-friendly certification management interface screen, a non-fungible token (NFT) interface screen and the like. The display module 240 may include an input function and an output function. For example, the display module 240 may include a touch panel for the input function, and a display panel for the output function.

FIG. 3 is an embodiment, and other embodiments of the apparatus 200 may not include some of the shown configurations, or may further include other configurations.

FIG. 4 is a flowchart illustrating a method for providing a recycling service for a plastic using a blockchain according to an embodiment of the present disclosure.

Referring to FIG. 4, the method for providing a recycling service for a plastic using a blockchain according to an embodiment of the present disclosure may include an operation of acquiring information on a recycled material (hereinafter, first information) (S410). For example, the operation S410 may be performed at a terminal on a side of the recycling company which recycles the recycled materials (e.g., the second electronic device 200 or the second-1 electronic device 201). The first information may be provided from the collection company which separates the recycled materials from waste products and sells, or may be acquired by analyzing the recycled materials purchased from the collection company. Alternatively, when the recycled material includes a QR code (the first-2 QR code) to be described below, the first information may be acquired by accessing the blockchain network through the first-2 QR code recognition.

The method may include an operation of registering the first information in the blockchain network (S420). For example, the recycling company-side terminal (e.g., the second electronic device 200 or the second-1 electronic device 201) may transmit the first information to the blockchain network 400 through the communication module so that the first information is stored in the blockchain network 400 in a distributed manner.

The method may include an operation of receiving and storing a QR code allowing access to the first information registered in the blockchain network (hereinafter, a first-1 QR code) (S430). For example, the recycling company-side terminal (e.g., the second electronic device 200 or the second-1 electronic device 201) may receive the first-1 QR code from the blockchain network through the communication module and store the first-1 QR code.

The method may include an operation of generating history information including the first-1 QR code (S440). For example, the recycling company-side terminal (e.g., the second electronic device 200 or the second-1 electronic device 201) may add the first-1 QR code to the delivery information of the recycled material to generate history information. The generated history information may be transmitted to an electronic device (e.g., the second-2 electronic device 202) of a purchaser who purchased the recycled material.

The method may include an operation of acquiring information on a composite prepared by compounding the recycled material and at least one additive (hereinafter, second information) (S510). For example, the operation S510 may be performed at the terminal of the recycling company which recycles the recycled materials (e.g., the second electronic device 200 or the second-2 electronic device 202). Specifically, the recycling company-side terminal (e.g., the second electronic device 200 or the second-2 electronic device 202) may acquire first information on the recycled material by accessing the blockchain network through the first-1 QR code, and acquire second information on the composite based on the acquired first information and information on the at least one additive.

The method may include an operation of registering the second information in the blockchain network (S520). For example, the recycling company-side terminal (e.g., the second electronic device 200 or the second-2 electronic device 202) may transmit the second information to the blockchain network through the communication module so that the second information is stored in the blockchain network in a distributed manner.

The method may include an operation of receiving and storing a QR code allowing access to the second information registered in the blockchain network (hereinafter, a first-2 QR code) (S530). For example, the recycling company-side terminal (e.g., the second electronic device 200 or the second-2 electronic device 202) may receive the first-2 QR code from the blockchain network through the communication module and store the first-2 QR code.

The method may include an operation of generating history information including the first-2 QR code (S540). For example, the recycling company-side terminal (e.g., the second electronic device 200 or the second-2 electronic device 202) may add the first-2 QR code to the delivery information of the composite to generate history information. The generated history information may be transmitted to an electronic device (e.g., the third electronic device 300 or the third-1 electronic device 301) of the purchaser who purchased the composite.

The recycling company-side terminal (e.g., the second electronic device 200 or the second-2 electronic device 202) may further receive a non-fungible token (NFT) representing a value of the composite from the blockchain network, and transmit the received non-fungible token (NFT)) to the purchaser's electronic device (e.g., the third electronic device 300 or the third-1 electronic device 301). The received non-fungible token (NFT) may be included in the delivery information.

The case where the operation S400 including operations S410 to S440 is performed in the second-1 electronic device 201, and the operation S500 including operations S510 to S540 is performed in the second-2 electronic device 202 has been described in FIG. 4. However, according to another embodiment, the operations S420 to S440 may be omitted. For example, when all classification of the recycled materials and the preparation of the composite are performed by one company, only the second information may be registered in the blockchain network without separately storing the first information in the blockchain network. The reason is that the first information is included in the second information.

The embodiments described above are illustrative of applying the principles of the present disclosure, and other configurations and variations of the embodiments may be further included without departing from the scope of the present disclosure. Furthermore, the embodiments may be combined to form additional embodiments.

What is claimed is:

1. A system for providing a recycling service of a plastic using a blockchain, the system comprising:

a first electronic device of a collection company which collects a recycled material from a waste product;

a second electronic device of a recycling company which compounds the recycled material with at least one additive to prepare a composite material; and a third electronic device of a production company which produces a product using the composite material, wherein the first electronic device is configured to manage information on the collected recycled material, wherein the second electronic device is configured to:

acquire information on the composite material;

register the acquired information on the composite material in a blockchain network in communication with the collection company, the recycling company, and the production company;

receive from the blockchain network a first two-dimensional code;

allow by recognition of the first two-dimensional code limited access only by users with permission to the information on the composite material registered in the blockchain network;

store the first two-dimensional code; and add the first two-dimensional code to delivery information of the composite material, and wherein the third electronic device is configured to:

recognize the first two-dimensional code;

access the information on the composite material registered in the blockchain network;

acquire the information on the composite material from the blockchain network; and manage a delivery history of the product produced using the composite material, wherein information on transaction details, stored in blocks of the blockchain for a period of time, are transmitted to all the users with permission, processes from collection of the recycled materials to disposal are tracked, thereby guaranteeing transparency and reliability of information generated at each process, and only user-approved blocks are connected to the blockchain, to thereby preventing arbitrary manipulation of data in the blockchain network.

2. The system according to claim 1, wherein, when the second electronic device includes a second-1 electronic device of a classification company which classifies the recycled materials by type, and a second-2 electronic device of a composite preparation company which prepares the composite material by compounding the classified recycled material and the at least one additive, the first two-dimensional code comprises:

a first-1 two-dimensional code allowing access to information on the classified recycled material registered in the blockchain network by the second-1 electronic device; and a first-2 two-dimensional code allowing access to the information on the composite material registered in the blockchain network by the second-2 electronic device.

3. The system according to claim 1, wherein, when the third electronic device includes a third-1 electronic device of a part production company which produces parts using the composite material, and a third-2 electronic device on a side of a finished product production company which produces a finished product using the parts, the third-1 electronic device is configured to:

register information on the parts in the blockchain network;

receive from the blockchain network a second two-dimensional code allowing access to the information on the parts registered in the blockchain network;

store the second two-dimensional code; and add the second two-dimensional code to delivery information of the parts.

4. The system according to claim 3, wherein when the collection company separates a recycled material from a finished product in which a disposal is requested, the first electronic device is configured to:

access the information stored in the blockchain network through two-dimensional code recognition when the separated recycled material includes the second two-dimensional code;

acquire information on the recycled material from the information stored in the blockchain network; and store the acquired information.

5. The system according to claim 1, wherein the second electronic device receives a non-fungible token (NFT) representing a value of the composite material from the blockchain network, and includes the non-fungible token with the delivery information of the composite material.

6. The system according to claim 5, wherein the non-fungible token includes at least one of issuance date information, transaction information, owner information, product information, and life cycle assessment (LCA) information of the composite material.

7. The system according to claim 1, wherein the second electronic device manages reception information of the recycled material, the delivery information of the composite material, reference information on the recycled material and the composite material, conversion rate information of the recycled material, and eco-friendly certification information on the composite material.

8. The system according to claim 1, wherein the delivery information of the composite material includes at least one of a feed source, feed type, ratio of each additive, composite grade, certification information, and life cycle assessment information.

9. An apparatus for providing a recycling service for a plastic using a blockchain, the apparatus comprising:

a communication module configured to perform communication connection with a blockchain network which stores data in a plurality of connected nodes in a distributed manner;

a memory configured to store reception/delivery history information; and a processor configured to:

acquire information on a composite material prepared by compounding a recycled material and at least one additive;

register the acquired information on the composite material in the blockchain network through the communication module in communication with a collection company, a recycling company, and a production company;

receive from the blockchain network a two-dimensional code;

allow by recognition of the two-dimensional code limited access only by users with permission to the information on the composite material registered in the blockchain network through the communication module;

store the two-dimensional code allowing access to the information on the composite material in the memory; and add the two-dimensional code allowing access to the information on the composite material to delivery information of the composite material, wherein information on transaction details, stored in blocks of the blockchain for a period of time, are transmitted to all the users with permission, processes from collection of the recycled materials to disposal are tracked, thereby guaranteeing transparency and reliability of information generated at each process, and only user-approved blocks are connected to the blockchain, to thereby preventing arbitrary manipulation of data in the blockchain network.

10. The apparatus according to claim 9, wherein the processor controls the communication module to transmit the delivery information of the composite material to which the two-dimensional code is added to an electronic device of a purchaser who purchased the composite material.

11. The apparatus according to claim 10, wherein the processor receives a non-fungible token (NFT) representing a value of the composite material from the blockchain network, and transmits the NFT to the purchaser's electronic device upon delivery of the composite material.

12. The apparatus according to claim 9, wherein the processor is configured to:

acquire information on the recycled material;

register the acquired information on the recycled material in the blockchain network;

receive from the blockchain network a two-dimensional code allowing access to the information on the recycled material registered in the blockchain network;

store the two-dimensional code allowing access to the information on the recycled material in the memory; and add the two-dimensional code allowing access to the information on the recycled material to delivery information of the recycled material.

13. The apparatus according to claim 12, wherein the processor transmits the delivery information of the recycled material including the two-dimensional code allowing access to the information on the recycled material to an electronic device of a purchaser who purchased the recycled material through the communication module.

14. The apparatus according to claim 12, wherein the processor accesses the blockchain network and acquires information on the recycled material from the blockchain network based on the two-dimensional code included in the delivery information of the recycled material.

15. A method for providing a recycling service for a plastic using a blockchain, the method comprising:

acquiring information on a composite material prepared by compounding a recycled material and at least one additive;

registering the acquired information on the composite material in a blockchain network in communication with a collection company, a recycling company, and a production company;

receiving from the blockchain network a two-dimensional code;

allowing, by recognition of the first two-dimensional code, limited access only by users with permission to the information on the composite material registered in the blockchain network;

storing the two-dimensional code in a memory; and adding the two-dimensional code allowing access to the information on the composite material to delivery information of the composite material, wherein information on transaction details, stored in blocks of the blockchain for a period of time, are transmitted to all the users with permission, processes from collection of the recycled materials to disposal are tracked, thereby guaranteeing transparency and reliability of information generated at each process, and only user-approved blocks are connected to the blockchain, thereby preventing arbitrary manipulation of data in the blockchain network.

16. The method according to claim 15, further comprising transmitting the delivery information of the composite material including the two-dimensional code allowing access to information on the composite material to an electronic device of a purchaser who purchased the composite material.

17. The method according to claim 16, further comprising:

receiving a non-fungible token (NFT) representing a value of the composite material from the blockchain network; and transmitting the non-fungible token to the purchaser's electronic device upon delivery of the composite material.

18. The method according to claim 15, further comprising:

acquiring information on the recycled material;

registering the acquired information on the recycled material in the blockchain network;

receiving a two-dimensional code allowing access to the information on the recycled material registered in the blockchain network and storing the two-dimensional code in the memory; and adding the two-dimensional code allowing access to the information on the recycled material to delivery information of the recycled material.

19. The method according to claim 18, further comprising transmitting the delivery information of the recycled material including the two-dimensional code allowing access to the information on the recycled material to an electronic device of a purchaser who purchased the recycled material.

20. The method according to claim 19, wherein the operation of acquiring the information on the composite material comprises accessing the blockchain network and acquiring information on the recycled material from the blockchain network based on the two-dimensional code included in the delivery information of the recycled material.

* * * * *